US010318765B2

(12) United States Patent
Rodgers et al.

(10) Patent No.: US 10,318,765 B2
(45) Date of Patent: Jun. 11, 2019

(54) PROTECTING CRITICAL DATA STRUCTURES IN AN EMBEDDED HYPERVISOR SYSTEM

(71) Applicant: Avago Technologies International Sales Pte. Limited, Singapore (SG)

(72) Inventors: Stephane Rodgers, San Diego, CA (US); Shashank Shekhar, San Diego, CA (US); Flaviu Dorin Turean, Palo Alto, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 269 days.

(21) Appl. No.: 14/530,020

(22) Filed: Oct. 31, 2014

(65) Prior Publication Data
US 2015/0317495 A1   Nov. 5, 2015

Related U.S. Application Data

(60) Provisional application No. 61/987,732, filed on May 2, 2014.

(51) Int. Cl.
*G06F 11/30* (2006.01)
*G06F 12/14* (2006.01)
(Continued)

(52) U.S. Cl.
CPC .......... *G06F 21/71* (2013.01); *G06F 9/45533* (2013.01); *G06F 21/44* (2013.01);
(Continued)

(58) Field of Classification Search
CPC .......... G06F 21/71; G06F 21/44; G06F 21/50; H04L 9/32; H04L 9/3247
(Continued)

(56) References Cited

U.S. PATENT DOCUMENTS

| 2008/0034350 A1* | 2/2008 | Conti | G06F 21/54 717/124 |
| 2008/0183996 A1* | 7/2008 | Field | G06F 9/468 711/163 |

(Continued)

FOREIGN PATENT DOCUMENTS

| CN | 1278082 A | 12/2002 |
| CN | 1816192 A | 8/2006 |

(Continued)

OTHER PUBLICATIONS

English language abstract for Chinese Patent Publication No. CN 1278082 A, published Dec. 27, 2000, from https://worldwide.espacenet.com, 2 pages.
(Continued)

*Primary Examiner* — Jeffrey C Pwu
*Assistant Examiner* — Samuel Ambaye
(74) *Attorney, Agent, or Firm* — Sterne, Kessler, Goldstein & Fox P.L.L.C.

(57) ABSTRACT

A system and method for securing a hypervisor and operating systems that execute on a computing device. An encrypted hypervisor is uploaded to a hardware chip. Prior to being executed, the hypervisor is decrypted using a secure security processor and stored in an on-chip memory. When a processor on the hardware chip executes the hypervisor, at least one on-chip component continuously authenticates the hypervisor during execution. A hypervisor configures a processor with access rights associated with an operating system, where the access rights determine access of the operating system to an at least one resource. A transaction filter then uses the access rights associated with the operating system to monitor the access of the operating system to the at least one resource in real-time as the operating system executes on a processor.

17 Claims, 8 Drawing Sheets

(51) Int. Cl.
*G06F 21/71* (2013.01)
*H04L 9/32* (2006.01)
*G06F 21/50* (2013.01)
*G06F 9/455* (2018.01)
*G06F 21/44* (2013.01)
*G06F 21/53* (2013.01)
*G06F 21/57* (2013.01)

(52) U.S. Cl.
CPC .............. *G06F 21/50* (2013.01); *G06F 21/53* (2013.01); *G06F 21/57* (2013.01); *H04L 9/3247* (2013.01); *G06F 2221/034* (2013.01)

(58) Field of Classification Search
USPC .......................................................... 713/192
See application file for complete search history.

(56) References Cited

U.S. PATENT DOCUMENTS

| | | | |
|---|---|---|---|
| 2010/0281273 A1* | 11/2010 | Lee .................... | G06F 21/72 713/190 |
| 2011/0154325 A1 | 6/2011 | Terasaki | |
| 2013/0151914 A1* | 6/2013 | Cadigan .............. | G06F 11/1068 714/723 |
| 2013/0160114 A1* | 6/2013 | Greenwood .......... | G06F 21/606 726/21 |
| 2014/0006804 A1 | 1/2014 | Tkacik et al. | |

FOREIGN PATENT DOCUMENTS

| | | |
|---|---|---|
| CN | 101939750 A | 1/2011 |
| CN | 101589365 B | 7/2012 |
| WO | WO 2008/091462 A1 | 7/2008 |

OTHER PUBLICATIONS

English language abstract for Chinese Patent Publication No. CN 1816192 A, published Aug. 9, 2006, from https://worldwide.espacenet.com, 2 pages.
English language abstract for Chinese Patent. Publication No. CN 101939750 A, published Jan. 5, 2011, from https://worldwide.espaceriet.com, 2 pages.
English language abstract for Chinese Patent Publication No. CN 101589365 B, published Jul. 4, 2012, from https://worldwide.espacenet.com, 2 pages.
First Office Action, for Chinese Patent Application No. 201510220085.9, dated Sep. 12, 2017, 8 pages.
English language translation of First Office Action, for Chinese Patent Application. No. 201510220085.9, dated Sep. 12, 2017, 12 pages.
Partial European Search Report, for European Patent Application No. 15163966.3, dated Oct. 22, 2015, 5 pages.
Extended European Search Report, for European Patent Application No. 5163966.3, dated Feb. 8, 2016, 10 pages.
Second Office Action, for Chinese Patent Application No. 201510220085.9, dated Mar. 27, 2018, 5 pages.

* cited by examiner

PROTECTING CRITICAL DATA STRUCTURES IN AN EMBEDDED HYPERVISOR SYSTEM

CROSS REFERENCE TO RELATED APPLICATIONS

This application claims the benefit of the U.S. Provisional Application No. 61/987,732 filed on May 2, 2014, which is incorporated by reference herein in its entirety.

FIELD

This application relates generally to computer security and more specifically to hypervisor security and security of resources on a computing device that are accessible to operating systems.

BACKGROUND

When multiple operating systems co-exist within a computing device, a hypervisor system is needed to distribute resources to the operating systems. However, when a hypervisor system is compromised, it may distribute resources to operating systems that otherwise would not be accessible to the operating systems.

There are many ways that a hypervisor system can be compromised. For example, a legitimate hypervisor may be replaced with a corrupt hypervisor. The memory tables that the hypervisor accesses may be replaced with corrupt memory tables. A legitimate hypervisor may be modified in a way that the hypervisor improperly configures a sandbox environment for an operating system and fails to shield critical resources of the computing device from being accessed by the operating system. Also, memory stack overloading or improper input/output handling by a hypervisor can allow a malicious operating system to enter the hypervisor mode and access critical resources.

To ensure that a hypervisor system remains uncorrupted, the hypervisor system requires security protection.

BRIEF DESCRIPTION OF THE DRAWINGS/FIGURES

The accompanying drawings, which are incorporated herein and form a part of the specification, illustrate the implementations and, together with the description, further serve to explain the principles of the implementations and to enable a person skilled in the pertinent art to make and use the implementations described herein.

Figure 1:
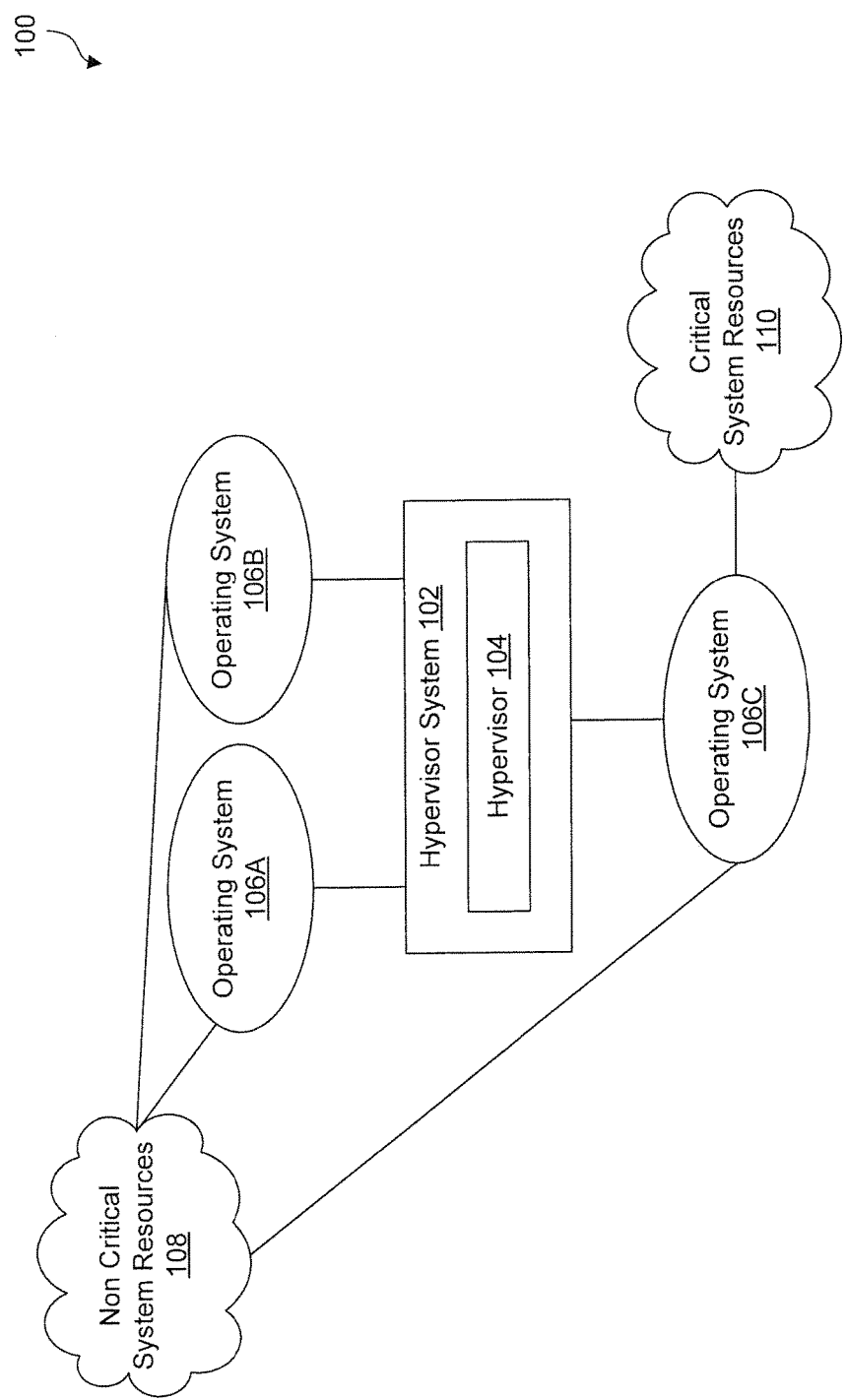
FIG. 1 is a block diagram of a hypervisor system distributing resources to operating systems, according to an implementation.

The implementations will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION

In a hypervisor system, a hypervisor layer is a root of software security protection. For example, when there are multiple untrusted processes, such as operating systems, a hypervisor system configures a sandbox environment within a computing device where untrusted operating systems execute but fail to obtain access to critical system resources.

FIG. 1 is a block diagram 100 of a hypervisor system distributing resources to operating systems, according to an implementation. Hypervisor system 102 in block diagram 100 includes a hypervisor 104. In an implementation, hypervisor 104 is a software module that manages multiple operating systems 106A-C. For example, hypervisor 104 allocates computing device's processor time, tables in volatile and non-volatile memory, and other resources to operating system 106A-C. Example processor, volatile and non-volatile memories are discussed in detail in FIG. 9.

For example, suppose operating systems 106A-B are untrusted operating systems. When hypervisor 104 allocates resources to operating systems 106A-B, hypervisor 104 creates a sandbox environment for operating systems 106A-B such that operating systems 106A-B are able to access non-critical system resources 108 on a computing device, but not critical system resources 110. On the other hand, suppose operating system 106C is a trusted operating system. In this case, hypervisor 104 creates a sandbox environment for operating system 106C that allows operating system 106C to access non-critical system resources 108 and some or all critical system resources 110.

In an implementation, non-critical system resources 108 are hardware and software resources within a computing device that do not hold information or include hardware that is critical to the performance of the computing device, that is not user specific or that can be accessed by different components executing within the computing device with or without authentication, to name a few examples.

In an implementation, critical system resources 110 are hardware and software resources within a computing device that perform security functions, hold information that influences performance of the computing device, is user specific and/or can be accessed by components executing within the computing device when the components are granted access rights to each, some or all of critical system resources 110, to name a few examples.

Figure 2:
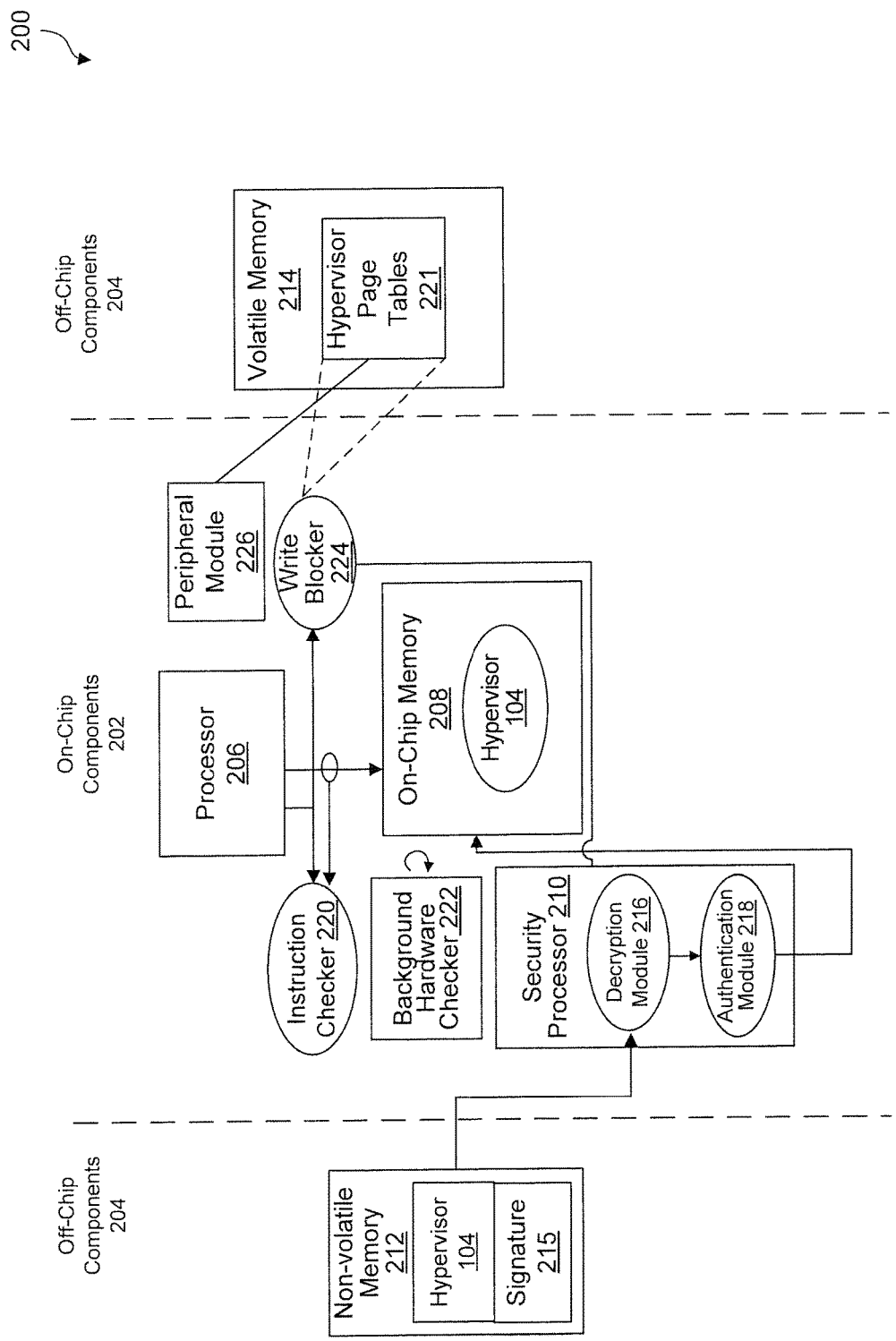
FIG. 2 is a block diagram of a secure hypervisor system, according to an implementation.

To ensure that hypervisor system 102 properly allocates resources to operating systems 106A-C, hypervisor system 102 is secured using hardware and software strategies. FIG. 2 is a block diagram a secure hypervisor system 200, according to an implementation. Secure hypervisor system 200 includes on-chip and off-chip components. On-chip components 202 are components that are within integrated circuits that function as a single unit and may include a processor and a memory. In an implementation, the integrated circuit may be a central processing unit ("CPU").

Off-chip components 204 are components that are located outside of an integrated circuit of a computing device. For example, off-chip components 204 may include memory that stores data that can be transferred onto the integrated circuit and then be executed using on-chip components 202.

In an implementation, on-chip components 202 include a processor 206 and on-chip memory 208. Processor 206 executes computing instructions and is described in detail in FIG. 9. On chip-memory 208, may be a volatile memory, such as a static random-access memory ("SRAM"). In an implementation, to ensure security, when hypervisor 104 executes on a computing device, hypervisor 104 executes using on-chip components 202, including on-chip processor 206 and from on-chip memory 208.

In an implementation, on-chip components 202 also include a security processor 210. Security processor 210 is an adjunct processor that authenticates and decrypts resources, such as hypervisor 104, before these resources can execute on a chip. To perform authentication, security processor 210 incudes various modules that support authentication algorithms, encryption/decryption algorithms, random number generation, and ensure secure key and data storage. In this way, sensitive data is decrypted and authenticated within a secure boundary of security processor 210.

Hypervisor system 200 also includes off-chip components 204, such as off-chip non-volatile memory 212 and volatile memory 214. Examples of non-volatile memory 212 and volatile memory 214 are described in detail in FIG. 9. In an implementation, hypervisor 104 may be stored in one of the off-chip components 204, such as non-volatile memory 212 or volatile memory 214 (not shown). When stored using non-volatile memory 212 or volatile memory 214, in some implementations, hypervisor 104 may be encrypted and/or signed using a digital signature 215.

In an implementation, when, prior to execution, hypervisor 104 is uploaded to on-chip memory 208, hypervisor 104 may be authenticated using security processor 210 as discussed above. To authenticate hypervisor 104, security processor 210 includes a decryption module 216 and authentication module 218.

In an implementation, decryption module 216 decrypts hypervisor 104 that may be encrypted when being stored on off-chip components 204. For example, decryption module 216 identifies a type of encryption, such as symmetric key encryption, public encryption, etc., that was used to encrypt hypervisor 104 and decrypts hypervisor 104 using the corresponding decryption type. For example, decryption module 216 may store within the boundary of security processor 210 decryption credentials, such as keys that correspond to credentials used to encrypt hypervisor 104.

In an implementation, authentication module 218 uses authentication mechanisms, such as password authentication, biometric authentication, etc., to authenticate hypervisor 104.

In an implementation, hypervisor system 200 also includes an instruction checker 220. Instruction checker 220 may be a hardware-based instruction checker that is one of on-chip components 202. Instruction checker 220 checks that hypervisor 104 executes from a specific memory range in on-chip memory 208. For example, by checking the memory range from which hypervisor 104 executes, instruction checker 220 ensures that other processes, such as operating systems 106A-C, do not install a fraudulent hypervisor in another memory location and then cause the fraudulent hypervisor to execute instead of hypervisor 104, or alternatively replace hypervisor 104 with a fraudulent hypervisor in on-chip memory 208 that may have a different memory range.

In an implementation, hypervisor page tables 221 are memory tables in off-chip memory, such as, volatile memory 214 that are initiated and accessed by hypervisor 104 when hypervisor 104 executes on processor 206. Hypervisor page tables 221 may also store addresses and other credentials associated with operating systems 106A-C that dictate which resources from non-critical system resources 108 and critical system resources 110 operating systems 106A-C are authorized to access. In another implementation, volatile memory 214 may also be part of on-chip components 202 (not shown.)

In another implementation, instruction checker 220 also ensures that hypervisor 104 is read from a memory range in on-chip memory 208 that stores hypervisor 104. To ensure that hypervisor 104 is read from a memory address associated with hypervisor 104, hypervisor 104 sets a hypervisor bit (not shown) in on-chip memory 208. Instruction checker 220 then checks whether a hypervisor bit is set in on-chip memory 208. A set hypervisor bit indicates that processor 206 is executing hypervisor 104 and hence memory addresses in on-chip memory 208 that stores hypervisor 206 is accessible to processor 206. However, when instruction checker 220 determines that hypervisor bit is not set, the memory addresses that stores hypervisor 104 in on-chip memory 208 are not accessible to processor 206. In this way, instruction checker 220 prevents one of operating systems 106A-C from changing the address of hypervisor 104 in on-chip memory and installing another hypervisor in on-chip memory 208.

In an implementation, hypervisor system 200 also includes a background hardware checker 222. Background hardware checker 222 may be one of on-chip components 202 and may be implemented using hardware. Background hardware checker 222 continuously executes in parallel with hypervisor 104, as indicated by an arrow loop in FIG. 2. During execution, background hardware checker 222 checks the hypervisor code digest against the value recovered from the signature 215 during authentication/decryption using security processor 210. A value from signature 215, for example, may be stored within security processor 210. For hypervisor 104 to continue to execute on processor 206, the value of signature 215 stored in security processor 210 and determined by write blocker 224 must match. When signatures do not match, there is an indication that hypervisor 104 is either corrupted or another process, such as one of operating systems 106A-C, executes the hypervisor specific code instead of hypervisor 104, and in this case, processor 206 may terminate the execution of hypervisor 104.

In an implementation, hypervisor system 200 also includes a write blocker 224. Write blocker 224 ensures that software and hardware components aside from hypervisor 104 (collectively referred to as peripherals 226) and operating systems 106A-C do not have write access to hypervisor page tables 221. In some implementations, peripherals 226 and operating systems 106A-C could have read access.

In an implementation, security processor 210 activates write blocker 224 and transmits information to write blocker 224 that allows write blocker 224 to differentiate hypervisor 104 from other components that execute within computing device included in hypervisor system 200.

Figure 3:
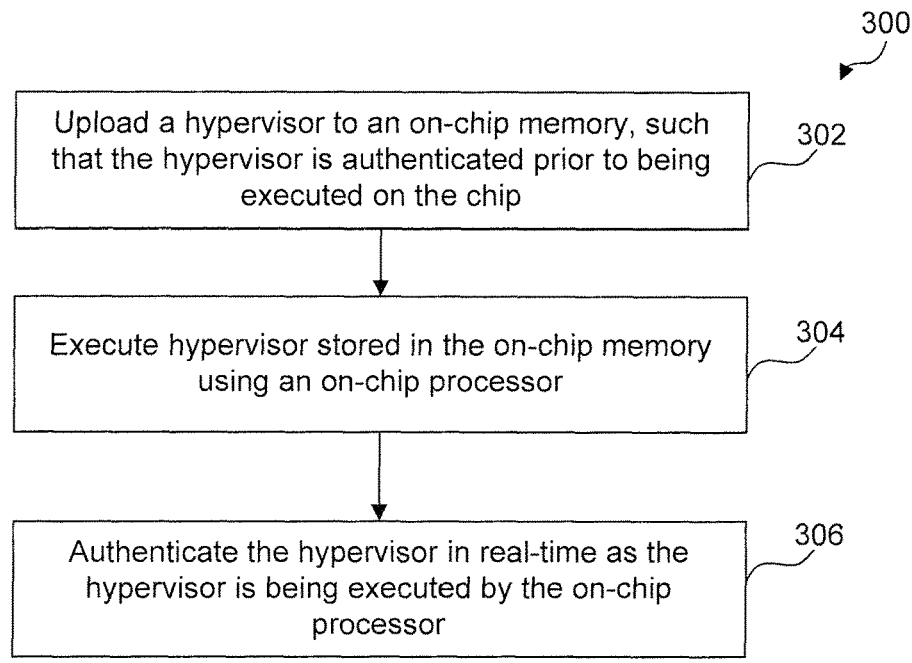
FIG. 3 is a flowchart of a method for securing a hypervisor system, according to an implementation.

FIG. 3 is a flowchart of a method 300 for securing a hypervisor system, according to an implementation.

At operation 302, hypervisor is uploaded to a memory internal to a chip. For example, hypervisor 104 is uploaded and stored in on-chip memory 208. As discussed above, prior to being uploaded to on-chip memory 208, hypervisor 104 may be decrypted and authenticated using security processor 210.

At operation 304, hypervisor is being executed on a chip. For example, hypervisor 104 is being executed using on-chip processor 206 while hypervisor 104 is stored in on-chip memory 208.

At operation 306, hypervisor is being continuously authenticated during execution. For example, as discussed in flowchart 400, various on-chip components 202 authenticate hypervisor 104 in parallel with hypervisor 104 being executed during operation 304.

Figure 4:
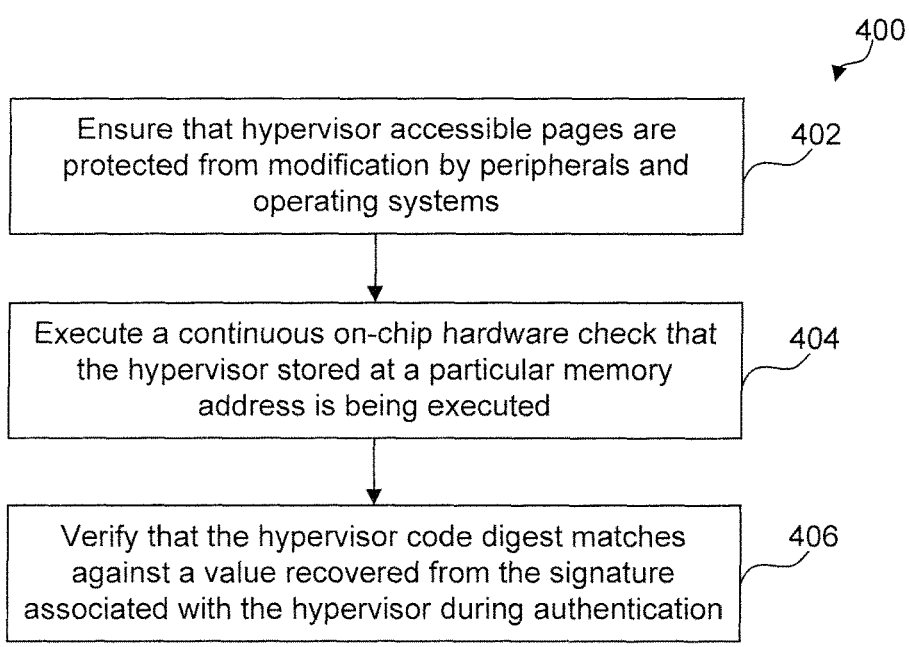
FIG. 4 is a flowchart of a method for authenticating hypervisor during execution, according to an implementation.

FIG. 4 is a flowchart 400 of a method for authenticating a hypervisor, according to an implementation. The operations in flowchart 400 are not necessarily sequential and can be performed in parallel with each other and with operation 304.

At operation 402, hypervisor accessible memory tables are protected from modification. In one implementation, write blocker 224 uses a digital signature 215 associated with hypervisor 104 to differentiate between hypervisor 104 and other components that execute within a chip that stores hypervisor 104 and ensures that only hypervisor 104 is able to modify, e.g. write to hypervisor page tables 221.

At operation 404, execution of a hypervisor code is verified. For example, instruction checker 220 verifies that a hypervisor bit is set within on-chip memory 208 when hypervisor 104 executes using processor 206. When a hypervisor bit is set, instruction checker 220 verifies that hypervisor 104 executes from an address range within on-chip memory 208 that stores hypervisor 104.

At operation 406, a code digest of a hypervisor is verified. For example, as hypervisor 104 executes, hypervisor's code digest is checked against a value recovered from the signature of hypervisor 104 at operation 302. The verification, using background hardware checker 222 in one implementation, ensures that the authenticated hypervisor executes on processor 206.

Figure 5:
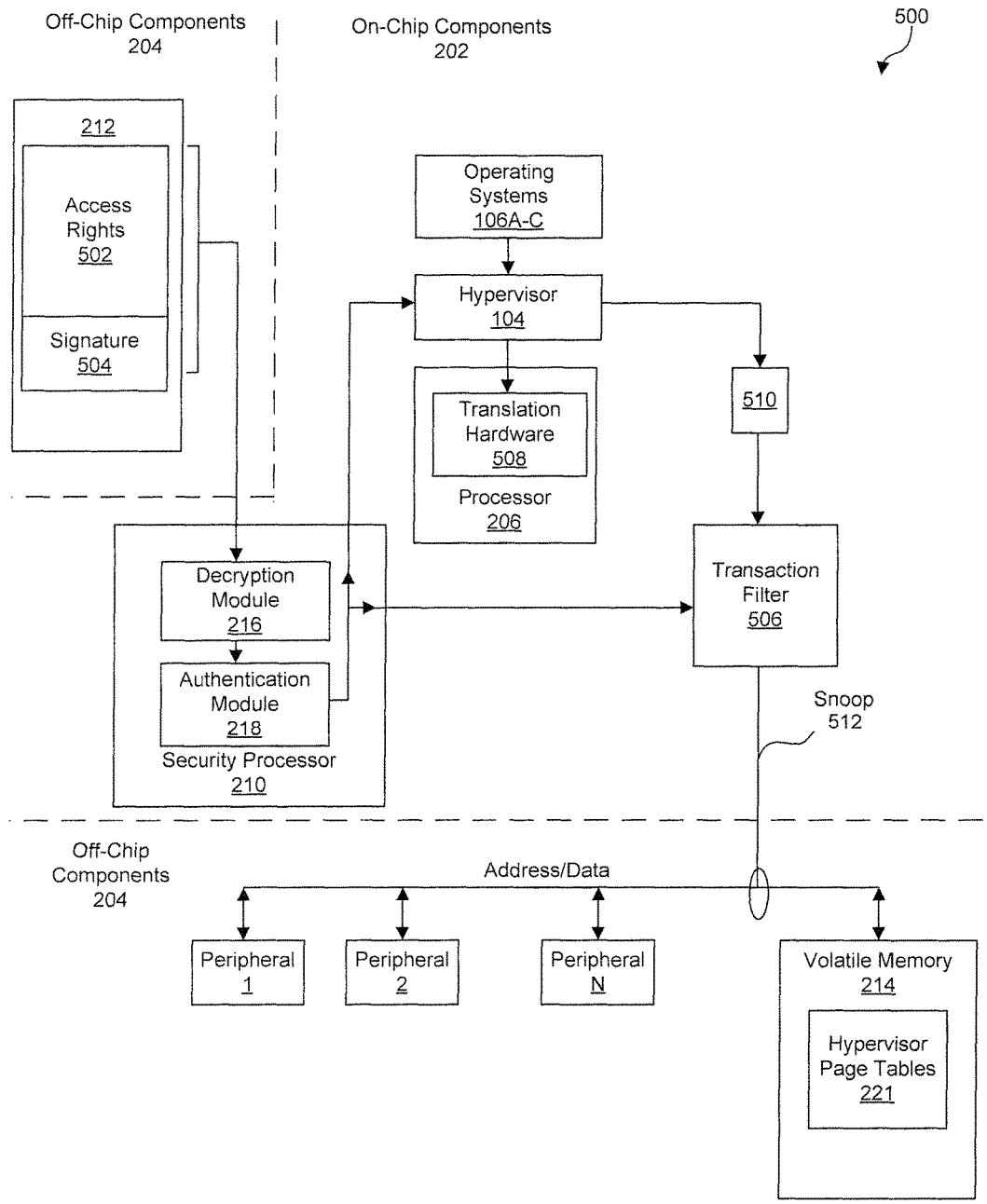
FIG. 5 is a block diagram of a hypervisor system executing operating systems, according to an implementation.

In addition to securing hypervisor 104 within hypervisor system 200, additional hardware redundancy checks on operating systems 106A-C may be implemented. These redundancy checks ensure that operating systems 106A-C that hypervisor 104 configures to execute on a chip access resources that are associated with the access rights granted to each of operating systems 106A-C. FIG. 5 is a block diagram of a hypervisor system 500 executing operating systems, according to an implementation.

In an implementation, hypervisor system 500 also includes off-chip components 204, such as, non-volatile memory 212, peripherals 1 . . . N and volatile memory 214. As discussed above, non-volatile memory 212 may be any type of non-volatile memory, including a flash drive, and is discussed in detail in FIG. 9. Peripherals 1 . . . N may be components and/or resources within a computing device that are accessible to or controlled by operating systems 106A-C, and also include critical system resources 110 and non-critical system resources 108 (not shown).

In an implementation, non-volatile memory 212 stores access rights 502 of operating systems 106A-C that execute on a computing device. For example, access rights 502 may store information that allows operating systems 106A-C to obtain access to particular peripherals 1-N, critical system resources 110 and non-critical system resources 108. In an implementation, access rights 502 may be encrypted using various encryption methodologies. In a further implementation, access rights 502 may also be signed using a digital signature, such as signature 504. Signature 504 may be stored together or separately from access rights 502. Access rights 502 may be stored in a data structure defined using a software programming language.

In an implementation, at boot time or at another time before operating systems 106A-C begin to execute on a chip, access rights 502 associated with operating systems 106A-C are uploaded to security processor 210 from non-volatile memory 212. Security processor 210 uses decryption module 216 to decrypt the encrypted access rights 502, and authentication module 218 to authenticate signature 504 associated with access rights 502, in a manner similar to the decryption and authentication of hypervisor 104, discussed above. In an implementation, the decryption and authentication functionalities may also be performed using hardware components within a chip, such as on-chip memory storage and processor 206 (not shown).

Once security processor 210 decrypts and authenticates access rights 502, the decrypted and authenticated access rights 502 are stored within hypervisor 104 and within transaction filter 506. In an implementation, transaction filter 506 is an on-chip hardware component that uses access rights 502 to enforce access of operating systems 106A-C to peripherals 1-N, non-critical system resources 108 and critical system resources 110.

In an implementation, transaction filter 506 is configured using security processor 210 and stores decrypted access rights 502. In some implementations, to maintain integrity of access rights 502, transaction filter 506 may be configured only using security processor 210. When hypervisor 104 configures operating systems 106A-C to execute on an on-chip processor 206 of a computing device, hypervisor 104 uses access rights 502 associated with each operating system 106A-C to configure each of operating system's 106A-C access to peripherals 1-N, non-critical system resources 108 and critical system resources 110. For example, hypervisor 104 configures address translation hardware 508 within processor 206 and hypervisor page tables 221 in volatile memory 214 to match the operating systems 106A-C respective access rights 502. For example, if an access right in access rights 502 associated with operating system 106A indicates that operating system 106A does not have access to peripheral 1 then hypervisor 104 ensures that operating system 106A cannot obtain access to peripheral 1.

In an implementation, FIG. 5 also includes an operating system register 510. Operating system register 510 stores an operating system identifier of one of operating systems 106A-C that is currently executing on processor 206. For example, when hypervisor 104 selects one of operating systems 106A-C to execute on CPU 506, hypervisor 104 stores the operating system identifier in operating system register 510.

Once one of operating systems 106A-C, such as operating system 106A executes on processor 206, transaction filter 506 uses access rights 512 provided by security processor 210 and operating system identifier provided by operating system register 510 to determine that operating system 106A executes on processor 206 and access rights 512 associated with operating system 106A. Transaction filter 506 then uses operating system register 510 and access rights 512 associated with operating system 106A to snoop busses 512. Busses 512 transmit data and address instructions to peripherals 1-N and volatile memory 214. For example, busses 512 may allow access to hypervisor page tables 221 of hypervisor 104 that are stored in volatile memory 214. When transaction filter 506 determines that operating system 106A does not have access to one or more of peripherals 1-N, or is attempting to generate an instruction that reads or writes data to resources that are incompatible with access rights 512 associated with operating system 106A, transaction filter 506 may block operating system 106A from making the transaction in real-time and prevent the transaction from occurring. In another implementation, transaction filter 506 may also alert security processor 210 that operating system 106A is attempting to make an unauthorized transaction and have security processor 210 take further action with respect to operating system 106A. In one example, security processor 210 may terminate, or cause processor 206 to terminate operating system 106A and prevent unauthorized resource access. This way, if hypervisor 104 or the operating system 106A is compromised, transaction filter 506 prevents access to peripherals 1-N and volatile memory 214 by the compromised operating system 106A.

In another implementation, processor 206 may be a multi-core processor. A multi-core processor has multiple independent cores that may simultaneously run multiple operating systems, such as operating systems 106A-C on one or more cores. This means, that each of the cores may be associated with a particular operating system. In an implementation, operating system register 510 may be implemented to include multiple registers that may act as a look-up table (not shown). The look-up table associates a core within the multi-core processor to a particular operating system. For example, a core having a core identifier=1 may be associated with a particular operating system identifier, such as an identifier of the operating system A. Alternatively, instead of multiple registers, a look-up table may also be stored in an on-chip memory 208.

In a multi-core implementation, when a transaction arrives at transaction filter 506, the transaction may be associated with a core identifier. Transaction filter 506 then uses a look-up table to map a core identifier to an operating system identifier associated with the core. Based on the operating system identifier, transaction filter 506 may then identify an operating system that requested the transaction. For example, a transaction that is associated with core identifier=1 may map to an identifier of operating system A. Once transaction filter 506 determines that a transaction is associated with operating system A, transaction filter 506 can then use an access right of access rights 502 associated with operating system A to determine whether to grant access of one or more of peripherals 1-N to the transaction.

Figure 6:
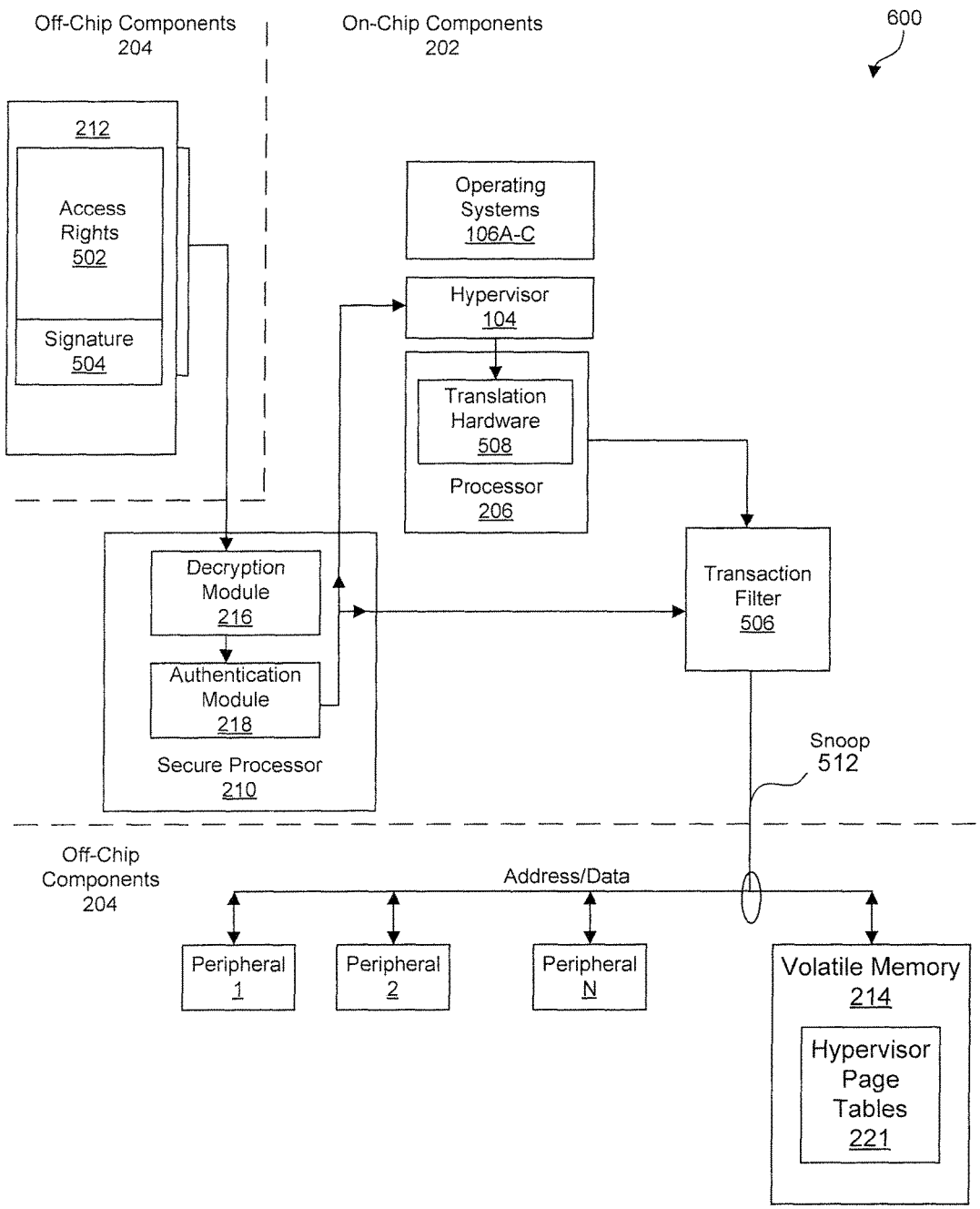
FIG. 6 is a block diagram of a hypervisor system executing operating systems, according to an implementation.

FIG. 6 is a block diagram of a hypervisor system 600 executing operating systems, according to an implementation. Hypervisor system 600 is an alternative implementation to hypervisor system 500. In hypervisor system 600, instead of operating system register 510, processor 206 tracks the operating system identifier of an executing operating system. In hypervisor system 600, transaction filter 506 receives the operating system identifier from processor 206.

Figure 7:
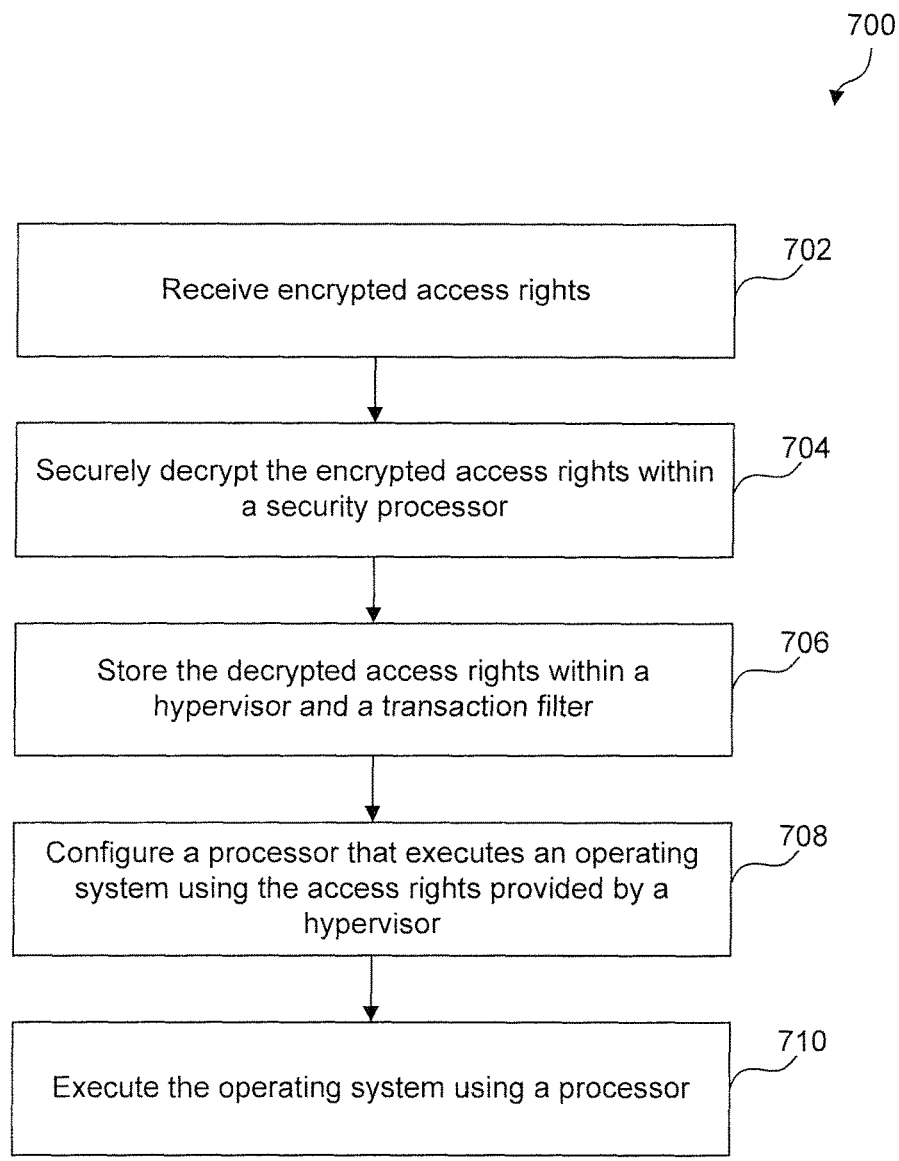
FIG. 7 is a flowchart of a method for initializing authentication mechanism for an operating system, according to an implementation.
Figure 8:
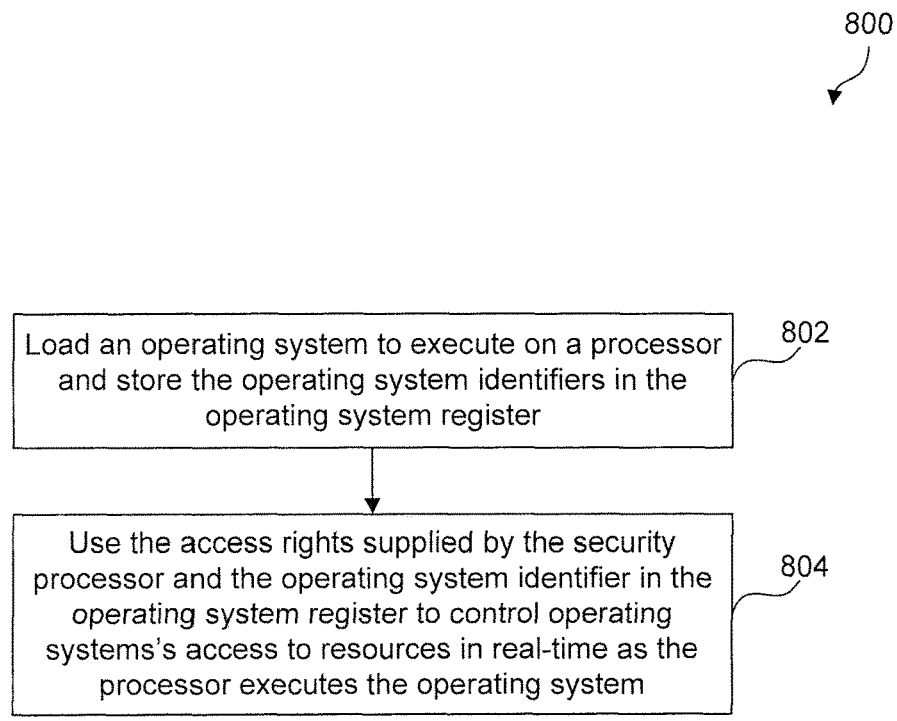
FIG. 8 is a flowchart of a method for authenticating an operating system, in real-time, as the operating system executes on a processor, according to an implementation.

FIG. 7 depicts a flowchart 700 of a method for initializing authentication mechanism of an operating system, according to an implementation.

At operation 702, encrypted access rights are received. For example, security processor 210 receives encrypted access rights 502 that are stored in non-volatile memory 212, such as a flash memory or another off-chip memory. As discussed, access rights 502 store information that allows operating systems 106A-C to obtain access to peripherals 1-N, critical system resources 110 and non-critical system resources 108.

At operation 704, access rights are securely decrypted. For example, security processor 210 uses decryption module 216 and/or authentication module 218 (depending on the type of encryption) to decrypt access rights 502 within the secure boundary of security processor. If security processor 210 is unable to decrypt access rights 512, the flowchart ends (not shown).

At operation 706, access rights are stored. For example, security processor 210 stores the decrypted access rights 512 within hypervisor 104 and transaction filter 506.

At operation 708, a processor that executes the operating system is configured to execute the operating system according to the access rights. For example, for each operating system 106A-C, hypervisor 104 configures address translation hardware 508 within processor 206 and hypervisor page tables 214 to match access rights 512 of each operating system 106A-C. This way, when processor 206 executes one of operating systems 106A-C, processor 206 executes one of operating system 106A-C according to the corresponding access rights 512. For example, if an access right in access rights 502 associated with operating system 106A indicates that operating system 106A does not have access to peripheral 1, then hypervisor 104 ensures that operating system 106A cannot obtain access to peripheral 1.

At operation 710, an operating system executes within a hypervisor system. The details of operation 710 are included in flowchart 800, according to an implementation, where an exemplary operating system 106A is authenticated as it is being executed by processor 206.

At operation 802, hypervisor loads an operating system to execute on a processor. For example, hypervisor 104 loads operating system 106A on processor 206. Concurrently with the load, hypervisor 104 also stores operating system identifier associated with operating systems 106A in operating system register 510.

At operation 804, a transaction filter controls an operating system access to resources in real-time. For example, transaction filter 506 uses access rights 512 provided by security processor 210 for operating system 106A and operating system identifier stored in operating system register 510 to snoop busses 512. As discussed above, busses 512 transmit data and address instructions to peripherals 1-N and volatile memory 214. When transaction filter 506 determines that operating system 106A does not have access to one or more of peripherals 1-N, or is attempting to generate an instruction that reads or writes data to resources that are incompatible with access rights 512 associated with the executing operating system, transaction filter 506 blocks operating system 106 from accessing the resources.

Figure 9:
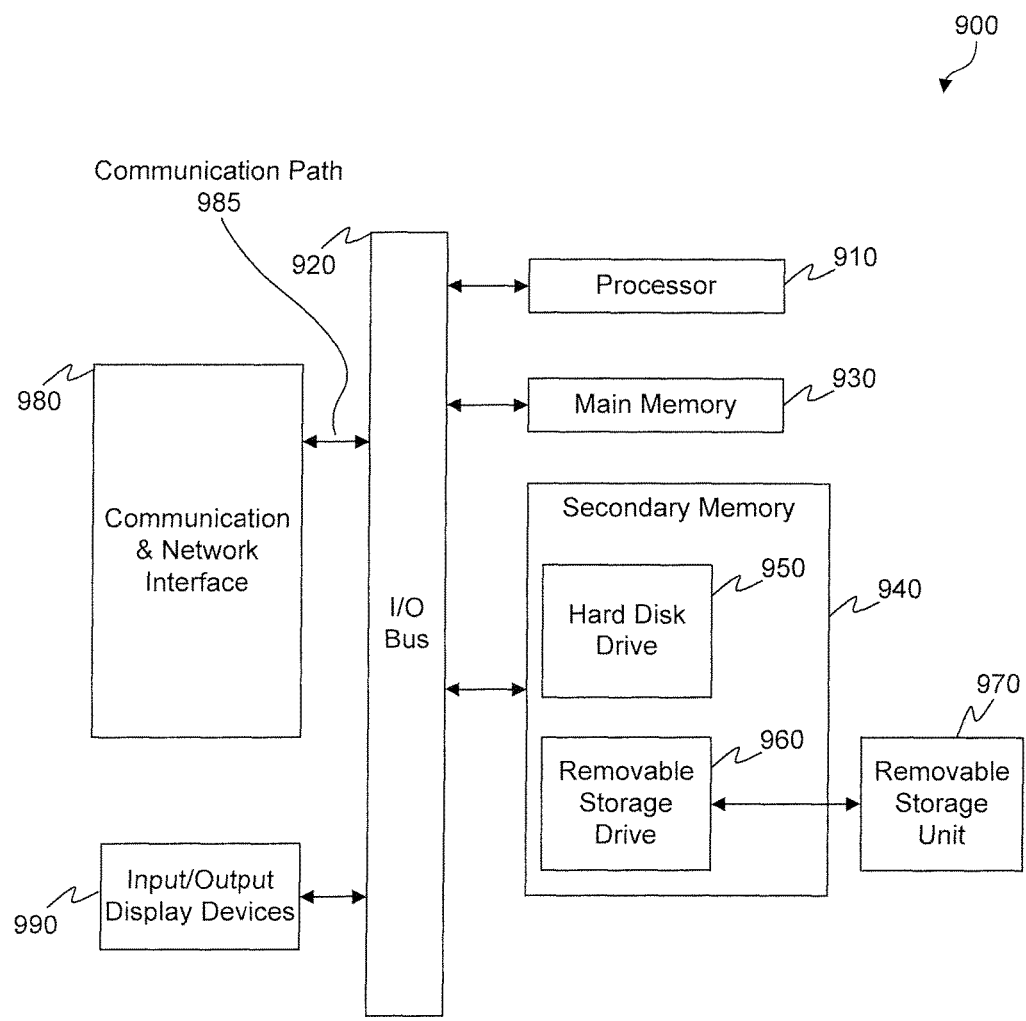
FIG. 9 illustrates an example computer system in which implementations, or portions thereof, can be implemented.

Various aspects of implementations can be implemented by software, firmware, hardware, or a combination thereof. FIG. 9 illustrates an example computer system 900 in which implementations, or portions thereof, can be implemented as computer-readable code. Various implementations are described in terms of this example computer system 900. After reading this description, it will become apparent to a person skilled in the relevant art how to implement the implementations using other computer systems and/or computer architectures.

Computer system 900 can be any commercially available and well known computer capable of performing the functions described herein, such as computers available from International Business Machines, Apple, Sun, HP, Dell, Compaq, Digital, Cray, etc.

The computer 900 includes one or more processors (also called central processing units, or CPUs), such as a processor 906. The processor 906 is connected to a communication bus 904.

The computer 900 also includes a main or primary memory 908, such as random access memory (RAM), static random access memory (SRAM) and dynamic random access memory (DRAM). The primary memory 908 has stored therein control logic 928A (computer software), and data. In an implementation, primary memory 908 is volatile memory as it maintains data only as long as power is applied to computer system 900.

The computer 900 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc. In an implementation, secondary storage devices 910 are examples of non-volatile memory as secondary storage devices 910 maintain data when power is and is not applied to computer system 900.

The removable storage drive 914 interacts with a removable storage unit 916. The removable storage unit 916 includes a computer useable or readable storage medium 924A having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 900 also includes input/output/display devices 922, such as monitors, keyboards, pointing devices, etc.

The computer 900 further includes a communication or network interface 918. The network interface 918 enables the computer 900 to communicate with remote devices. For example, the network interface 918 allows the computer 900 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 900 via the communication medium 924B. More particularly, the computer 900 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 900, the main memory 908, secondary storage devices 910, the removable storage unit 916 and the carrier waves modulated with control logic 930. Such computer program products, having control logic stored therein that, when executed by one or more data processing devices, cause such data processing devices to operate as described herein, represent implementations.

The implementations discussed herein can work with software, hardware, and/or operating system implementations other than those described herein. Any software, hardware, and operating system implementations suitable for performing the functions described herein can be used.

While various implementations have been described above, it should be understood that they have been presented by way of example only, and not limitation. It will be apparent to persons skilled in the relevant art that various changes in form and detail can be made therein without departing from the spirit and scope of the discussed implementations. Thus, the breadth and scope of the implementations should not be limited by any of the above-described exemplary implementations, but should be defined only in accordance with the following claims and their equivalents.

What is claimed is:

1. A system on a chip, comprising:
    a security processor configured to receive access rights associated with an operating system from an off-chip memory;
    a hypervisor configured to:
        install the access rights associated with the operating system on a processor executing on the chip, wherein the access rights associated with the operating system determine access of the operating system to at least one resource, and
        execute hypervisor specific code as the operating system executes on the processor, the hypervisor specific code including configuring access rights within a hypervisor page table of the off-chip memory according to the access rights of the operating system;
    an on-chip memory configured to store the hypervisor, the hypervisor being associated with a digital signature when stored in the on-chip memory;
    a transaction filter configured to prevent, using the access rights of the operating system, unauthorized access of the operating system to the least one resource in real-time as the operating system executes on the processor;
    a write blocker configured to utilize the digital signature to differentiate between the hypervisor and other components executing on the chip to ensure only the hypervisor modifies the hypervisor page table as the operating system executes on the processor;
    a background hardware checker configured to verify a code digest value associated with the hypervisor specific code matches the digital signature associated with the hypervisor as the operating system executes on the processor to verify the hypervisor is executing the hypervisor specific code; and
    an instruction checker configured to verify the hypervisor executes the hypervisor specific code from a specific range of addresses in the on-chip memory.

2. The system on the chip of claim 1, wherein the security processor is further configured to:
    decrypt the access rights of the operating system; and
    store the access rights of the operating system in the hypervisor and the transaction filter.

3. The system on the chip of claim 2, wherein the security processor is further configured to decrypt the access rights of the operating system prior to storing the access rights of the operating system in the hypervisor and the transaction filter.

4. The system on the chip of claim 2, wherein the access rights of the operating system are encrypted using the digital signature when the access rights of the operating system are stored in the off-chip memory.

5. The system on the chip of claim 1, wherein the hypervisor is further configured to load the operating system into the processor, wherein the system further comprises an operating system register configured to store an operating system identifier of the operating system, and wherein the hypervisor is further configured to store the operating system identifier in the operating system register prior to the processor executing the operating system.

6. The system on the chip of claim 5, wherein the transaction filter is further configured to:

retrieve the operating system identifier from the operating system register; and monitor, using the operating system identifier in combination with the access rights of the operating system, the access of the operating system to the at least one resource as the operating system executes on the processor.

7. The system on the chip of claim 1, wherein the at least one resource includes a hypervisor accessible memory table located on the off-chip memory.

8. The system on the chip of claim 1, wherein the transaction filter is further configured to monitor instructions transmitted by the operating system to a bus coupled to the at least one resource.

9. The system on the chip of claim 8, wherein the transaction filter is further configured to block access of the operating system to the at least one resource when the monitoring of the instructions determines the operating system does not have access to the at least one resource.

10. The system on the chip of claim 1, wherein the processor is further configured to store an operating system identifier of the operating system; and wherein the transaction filter is further configured to:

retrieve the operating system identifier from the processor; and monitor, using the operating system identifier in combination with the access rights of the operating system, the access of the operating system to the at least one resource as the operating system executes on the processor.

11. A system on a chip, comprising:

an off-chip memory that stores a hypervisor prior to the hypervisor being uploaded to the chip;

an on-chip memory configured to store the hypervisor, the hypervisor being associated with a digital signature when stored in the on-chip memory;

a processor configured to execute hypervisor specific code of the hypervisor stored in the on-chip memory as an operating system executes on the processor, the hypervisor specific code including configuring access rights within a hypervisor page table of the off-chip memory according to access rights of the operating system;

a transaction filter configured to prevent, using the access rights of the operating system, unauthorized access of the operating system to the least one resource in real-time as the operating system executes on the processor;

a write blocker configured to utilize the digital signature to differentiate between the hypervisor and other components executing on the chip to ensure only the hypervisor modifies the hypervisor page table as the operating system executes on the processor;

a background hardware checker configured to verify a code digest value associated with the hypervisor specific code matches the digital signature associated with the hypervisor as the operating system executes on the processor to verify the hypervisor is executing the hypervisor specific code; and an instruction checker configured to verify the hypervisor executes the hypervisor specific code from a specific range of addresses in the on-chip memory.

12. The system on the chip of claim 11, wherein the hypervisor is stored in the off-chip memory in an encrypted form.

13. The system on the chip of claim 12, further comprising a security processor configured to authenticate the hypervisor stored in the encrypted form in the off-chip memory before the hypervisor is stored in the on-chip memory.

14. The system on the chip of claim 11, wherein the transaction filter is further configured to monitor instructions transmitted by the operating system to a bus coupled to the at least one resource.

15. The system on the chip of claim 14, wherein the transaction filter is further configured to block access of the operating system to the at least one resource when the monitoring of the instructions determines the operating system does not have access to the at least one resource.

16. The system on the chip of claim 11, wherein the processor is further configured to store an operating system identifier of the operating system; and wherein the transaction filter is further configured to:

retrieve the operating system identifier from the processor; and monitor, using the operating system identifier in combination with the access rights of the operating system, the access of the operating system to the at least one resource as the operating system executes on the processor.

17. A method, comprising:

installing access rights associated with an operating system on a processor executing on a chip, wherein the access rights associated with the operating system determine access of the operating system to at least one resource;

uploading a hypervisor to the chip from an off-chip memory storage, wherein the hypervisor is encrypted prior to being uploaded to the chip;

decrypting the hypervisor using a security processor;

based on the decrypting, storing the hypervisor in an on-chip memory storage prior to executing the hypervisor;

executing hypervisor specific code of the hypervisor from the on-chip memory storage as the operating system executes on the processor, the hypervisor specific code including configuring access rights within a hypervisor page table of the off-chip memory storage according to the access rights of the operating system;

preventing, using the access rights of the operating system, unauthorized access of the operating system to the least one resource in real-time as the operating system executes on the processor;

verifying a code digest value associated with the hypervisor specific code matches the digital signature associated with the hypervisor as the operating system executes on the processor to verify the hypervisor is executing the hypervisor specific code; and verifying the hypervisor executes the hypervisor specific code from a specific range of addresses in the on-chip memory storage.

* * * * *

UNITED STATES PATENT AND TRADEMARK OFFICE
CERTIFICATE OF CORRECTION

PATENT NO. : 10,318,765 B2
APPLICATION NO. : 14/530020
DATED : June 11, 2019
INVENTOR(S) : Rodgers et al.

Page 1 of 1

It is certified that error appears in the above-identified patent and that said Letters Patent is hereby corrected as shown below:

In the Claims

Column 10, Line 35, Claim 1 replace "operating system to the least" with --operating system to the at least--.

Column 11, Line 54, Claim 11 replace "operating system to the least" with --operating system to the at least--.

Column 12, Line 54, Claim 17 replace "operating system to the least" with --operating system to the at least--.

Signed and Sealed this
Twenty-first Day of April, 2020

Andrei Iancu
*Director of the United States Patent and Trademark Office*